United States Patent
Chen et al.

(10) Patent No.: US 7,320,952 B2
(45) Date of Patent: Jan. 22, 2008

(54) ADDITIVE FOR VISCOELASTIC FLUID

(75) Inventors: Yiyan Chen, Richmond, TX (US); Jesse C. Lee, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 235 days.

(21) Appl. No.: 11/033,651

(22) Filed: Jan. 12, 2005

(65) Prior Publication Data

US 2005/0155762 A1 Jul. 21, 2005

Related U.S. Application Data

(60) Provisional application No. 60/538,025, filed on Jan. 21, 2004.

(51) Int. Cl.
*C09K 8/588* (2006.01)
(52) U.S. Cl. ............ 507/240; 507/241; 507/255; 507/260; 507/261; 507/266; 507/267; 166/282
(58) Field of Classification Search ............... 507/240, 507/241
See application file for complete search history.

(56) References Cited

U.S. PATENT DOCUMENTS

| 2,614,982 | A | * | 10/1952 | Caldwell et al. ............ 507/261 |
| 2,614,983 | A | * | 10/1952 | Caldwell et al. ............ 507/261 |
| 2,722,099 | A | * | 11/1955 | Wasserbach ................. 60/209 |
| 4,284,414 | A | * | 8/1981 | Bryant .......................... 44/396 |
| 4,464,182 | A | * | 8/1984 | Tack et al. .................... 44/393 |
| 5,124,059 | A | * | 6/1992 | Koch et al. ................... 508/468 |
| 5,167,281 | A | * | 12/1992 | Kalfoglou ..................... 166/275 |
| 5,979,557 | A |   | 11/1999 | Card et al. .................... 166/300 |
| 6,187,065 | B1 | * | 2/2001 | Jackson ......................... 44/393 |
| 6,258,859 | B1 |   | 7/2001 | Dahayanake et al. ......... 516/77 |
| 6,435,277 | B1 |   | 8/2002 | Qu et al. ...................... 166/281 |
| 6,703,352 | B2 |   | 3/2004 | Dahayanake et al. ........ 507/241 |
| 2003/0134751 | A1 |   | 7/2003 | Lee et al. ..................... 507/200 |

FOREIGN PATENT DOCUMENTS

WO WO 9856497 A1 * 12/1998

OTHER PUBLICATIONS

U.S. Appl. No. 10/994,664, filed Nov. 22, 2004 titled, "Viscoelastic Surfactant Rheology Modification".
U.S. Appl. No. 11/012,446, filed Dec. 15, 2004 titled, "Viscoelastic Surfactant Rheology Modification".

* cited by examiner

*Primary Examiner*—Randy Gulakowski
*Assistant Examiner*—John J. Figueroa
(74) *Attorney, Agent, or Firm*—Darla Fonseca; David Cate; Robin Nava

(57) ABSTRACT

Composition and method for shortening the shear recovery time of cationic, zwitterionic, and amphoteric viscoelastic surfactant fluid systems by adding an effective amount of a co-gelling agent selected from triblock oligomeric compounds having hydrophilic (for example polyether) and hydrophobic (for example alkyl) portions. The co-gelling agent also increases fluid viscosity and very low co-gelling agent concentration is needed. Preferred surfactants are betaines and quaternary amines. The fluids are useful in oilfield treatments, for example fracturing and gravel packing.

6 Claims, 1 Drawing Sheet

ADDITIVE FOR VISCOELASTIC FLUID

CROSS-REFERENCE TO RELATED APPLICATION

This application claims the benefit of U.S. Provisional Patent Application No. 60/538,025, filed on Jan. 21, 2004.

BACKGROUND OF THE INVENTION

The invention relates to co-gelling agents for viscoelastic surfactant fluid systems. More particularly it relates to selection and optimization of co-gelling agents for fluid systems to be used over broad ranges of salinity and temperature. Most particularly it relates to co-gelling agents to shorten shear recovery times and increase the viscosity of VES's for use in oilfield treatment fluids.

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary and, among other functions may increase the stability (especially thermal stability) or increase the viscosity of the systems by modifying and/or stabilizing the micelles; all the components together are called a viscoelastic surfactant fluid system. Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and requires the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, co-gelling agents, rheology modifiers, or rheology enhancers, etc., and typically are alcohols, organic acids such as carboxylic acids and sufonic acids, sulfonates, and others. We shall use the term co-gelling agents here. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, there is a need for chemical additives that are effective for increasing the viscosity of VES systems at a given temperature, and/or for increasing the temperature at which such VES systems maintain the viscosities that make the fluids useful. Furthermore, many VES fluid systems exhibit long viscosity recovery times after experiencing prolonged high shear. Slow recovery after shear negatively impacts drag reduction and proppant transport capability, which consequently leads to undesirably high treating pressures and risks of near wellbore screen-outs. To overcome the deleterious effects of slow shear recovery, higher VES concentrations may sometimes be used. There is a need for additives that extend the conditions under which VES systems can be used, and reduce the amount of surfactant needed, which in turn reduces the cost and improves clean-up in many uses, such as, but not limited to, uses as oilfield treatment fluids, especially stimulation fluids, most especially hydraulic fracturing fluids. Although additives are known that can shorten VES shear recovery times and increase viscosities (see for example U.S. patent application Ser. Nos. 10/994,664 and 11/012,446, both of which are assigned to the same assignee as the present application and both of which are hereby incorporated in their entirety), there is still a need for additional simple, inexpensive rheology enhancers.

SUMMARY OF THE INVENTION

One embodiment is an aqueous oilfield treatment composition containing a viscoelastic surfactant and a co-gelling agent. The co-gelling agent has a structure selected from ABC and BAD, in which A and B are connected by an ether linkage or an ester linkage, B and C are connected by an ether linkage or an ester linkage, A and D are connected by an ether linkage or an ester linkage, the two linkages in the co-gelling agent may be the same or different, A and C are hydrophobic and may be the same or different and may contain amine, amide, and ester groups, and B and D are hydrophilic and may be the same or different. A and C are saturated or unsaturated, linear or branched alkyl and may contain one or more aromatic rings; A and C are the same or different, and B and D are ionic or non-ionic and may be the same or different.

Examples of the composition of the co-gelling agent include $H(CH_2)_x(OCH_2CH_2)_yO(CH_2)_zH$, $H(CH_2)_xCO(OCH_2CH_2)_yOCO(CH_2)_zH$, $HO(CH_2CH_2O)_xCO(CH_2)_yCO(OCH_2CH_2)_zOH$, and $HO(CH_2CH_2O)_x(CH_2)_y(OCH_2CH_2)_zOH$, in which y is from about 10 to about 50, preferably from about 24 to about 36; y' is from about 4 to about 50, preferably from about 6 to about 24; x and z are from about 6 to about 22, preferably from about 8 to about 16; and x' and z' are from about 1 to about 50, preferably from about 3 to about 40. The values of x and z, and of x' and z', may be the same.

The concentration of the co-gelling agent is from about 0.005 to about 3%, preferably from about 0.01 to about 0.5%, most preferably from about 0.01 to about 0.1%. The composition may contain a polynaphthalene sulfonate.

In a further embodiment, the viscoelastic surfactant contains a zwitterionic surfactant that may have the formula:

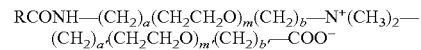

in which R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. As an example, the zwitterionic surfactant has the betaine structure:

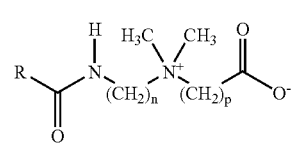

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Examples of the betaine structure are oleylamidopropyl betaine and erucylamidopropyl betaine. The fluid may also contain a co-surfactant. An example of an aqueous oilfield treatment composition is one in which the viscoelastic surfactant contains erucylamidopropyl betaine and the co-gelling agent contains $H(CH_2)_x CO(OCH_2CH_2)_y OCO(CH_2)_z H$ in which x=z=12 and y=32.

In yet a further embodiment, the viscoelastic surfactant contains a cationic surfactant, for example a surfactant or mixture of surfactants having the structure:

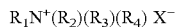

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds. As a further example, $R_1$ comprises from about 18 to about 22 carbon atoms and may comprise a carbonyl, an amide, or an amine; $R_2$, $R_3$, and $R_4$ comprise from 1 to about 3 carbon atoms, and $X^-$ is a halide. As yet a further example, $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

In another embodiment, the cationic viscoelastic surfactant may also contain an amine, for example having the structure:

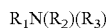

in which $R_1$, $R_2$, and $R_3$ are as defined above. The amine may be present, for example, at a concentration of between about 0.01 and about 1 percent.

In another embodiment, the viscoelastic surfactant contains an amine oxide.

In yet another embodiment, the aqueous oilfield treatment composition may optionally contain an acid selected from hydrochloric acid, hydrofluoric acid, formic acid, acetic acid, lactic acid, glycolic acid, sulfamic acid, malic acid, citric acid, tartaric acid, maleic acid, methylsulfamic acid, chloroacetic acid, and mixtures of these acids.

A further embodiment is a concentrate for addition to an aqueous fluid to form a viscoelastic fluid, the concentrate containing a freezing point depressant, less than about 60% water, a co-gelling agent as described above, and a viscoelastic surfactant.

A further embodiment is a method of shortening the shear recovery time of a viscoelastic surfactant based fluid involving a.) providing a fluid containing a viscoelastic surfactant and b.) mixing with the fluid a co-gelling agent in a concentration sufficient to shorten the shear recovery time of the fluid. The co-gelling agent has a structure selected from ABC and BAD in which A and B are connected by an ether linkage or an ester linkage, B and C are connected by an ether linkage or an ester linkage, A and D are connected by an ether linkage or an ester linkage, the two linkages in the co-gelling agent may be the same or different, A and C are hydrophobic and may be the same or different and may contain amine, amide, and ester groups, and B and D are hydrophilic and may be the same or different.

Yet another embodiment is an oilfield treatment method involving: a) providing a fluid containing a viscoelastic surfactant and a co-gelling agent having a structure selected from ABC and BAD in which A and B are connected by an ether linkage or an ester linkage, B and C are connected by an ether linkage or an ester linkage, A and D are connected by an ether linkage or an ester linkage, the two linkages in the co-gelling agent may be the same or different, A and C are hydrophobic and may be the same or different and may contain amine, amide, and ester groups, and B and D are hydrophilic and may be the same or different, and injecting the fluid down a well.

DETAILED DESCRIPTION OF THE INVENTION

Figure 1:
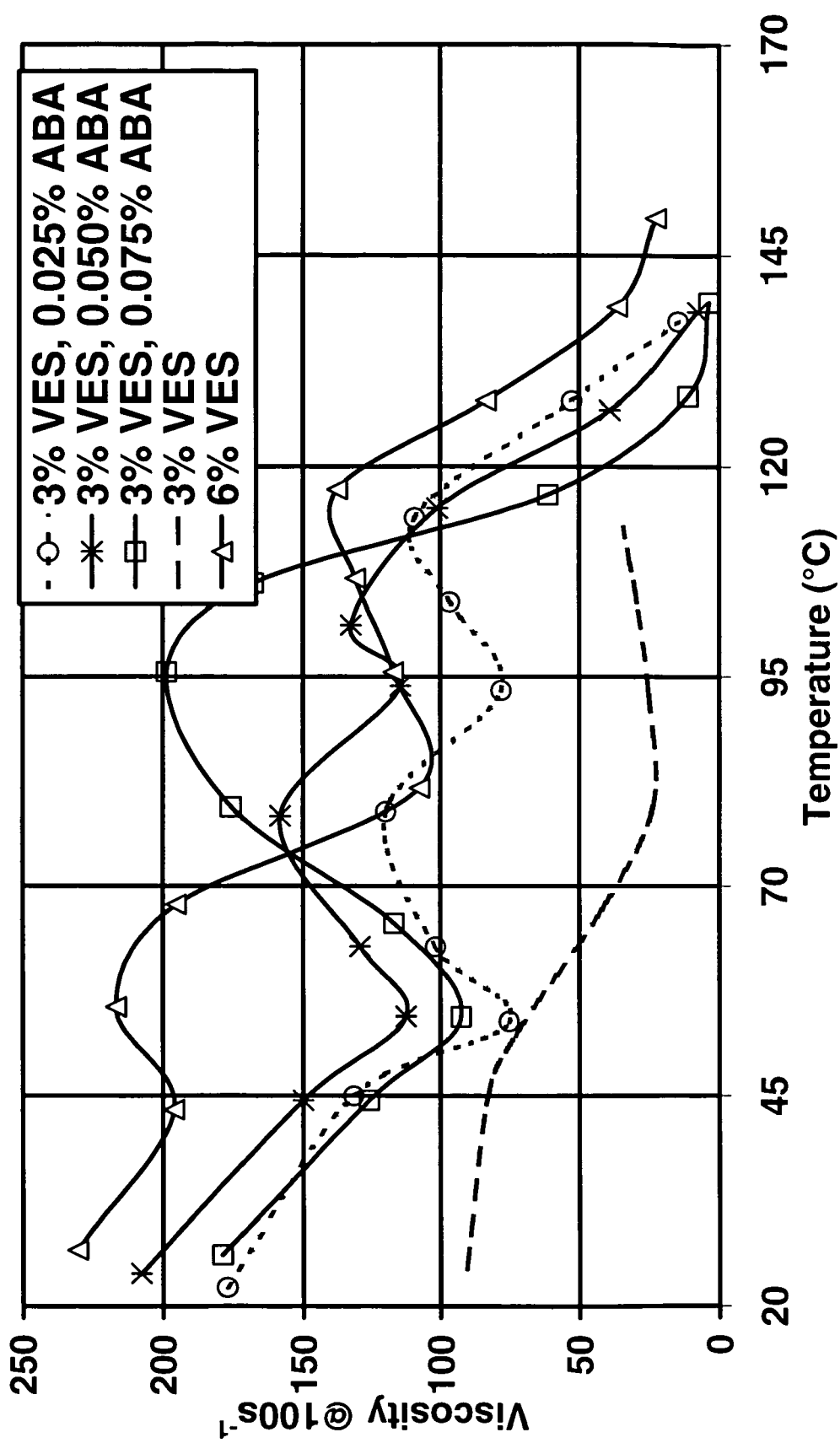
FIG. 1 shows the viscosity of VES fluid systems, with and without co-gelling agents of the invention, as a function of temperature.

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling of the micelle structure (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface. Thus viscosity and shear rehealing rate are both important fluid theological properties.

Although viscoelastic surfactant fluid systems have been shown to have excellent viscoelastic properties for hydraulic fracturing applications, shear recovery time, not fluid viscosity, often dictates the minimum concentration of surfactant required. For example, a fluid made with a certain concentration of surfactant may show adequate viscosity for fracturing at a given temperature, but the minimum usable concentration may be higher due to slow shear recovery with the lower concentration. An acceptable shear recovery time is considered to be about 15 seconds. A time longer than about 15 seconds will negatively impact drag reduction and proppant transport. Shortening the viscosity-recovery time makes it possible to use VES fluid systems and/or concentrations that would otherwise not be suitable in many applications. In addition, when a rheology modifier also increases fluid viscosity, then less surfactant is needed to provide a given viscosity. Examples of rheology enhancers are given in U.S. patent application Ser. No. 10/994,664.

We have found that certain simple chemical additives, when included in certain viscoelastic surfactant fluid systems (such as cationic, amphoteric, and zwitterionic viscoelastic surfactant fluid systems, especially betaine zwitterionic viscoelastic surfactant fluid systems), in the proper concentrations relative to the surfactant active ingredients, a) significantly shorten the shear recovery times of the systems, b) increase the viscosities of the VES systems at a given temperature, and c) increase the temperatures at which such VES systems maintain viscosities that make the fluids useful for many purposes, such as, but not limited to, uses as oilfield treatment fluids, especially stimulation fluids, most especially hydraulic fracturing fluids. In many cases, the shear recovery is nearly instantaneous. We will call these materials "co-gelling agents" here. The co-gelling agents extend the conditions under which the VES systems can be used, and reduce the amount of surfactant needed, which in turn reduces the cost and improves the clean-up.

In general, the formulas of representative categories of chemicals that serve as co-gelling agents are triblock oligomers whose structure can be written as ABC or BAD, where A and C are hydrophobic and may be the same or different and may contain amine, amide, and ester groups, and can be an alkyl group (saturated or unsaturated, linear or branched, or containing one or more aromatic rings), and B and D are hydrophilic and may be the same or different, and may be ionic, for example may be polyacrylate, or non-ionic, with non-ionic being better for the betaine systems, and polyether being preferred. Shown below are four examples:

   (1)

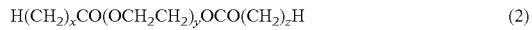   (2)

   (3)

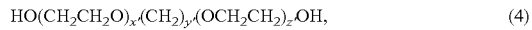   (4)

In these formulas, y is from about 10 to about 50, preferably from about 24 to about 36; y' is from about 4 to about 50, preferably from about 6 to about 24; x and z are from about 6 to about 22, preferably from about 8 to about 16; and x' and z' are from about 1 to about 50, preferably from about 3 to about 40. ABA systems in which x=z and x'=z' are preferred because such materials are generally easier to synthesize and therefore are generally less expensive. ABA systems are demonstrated in the examples below, but ABC, BAB, and BAD systems may be used. Furthermore, the A, B, C, and D blocks may be further substituted provided that the substitution does not change the hydrophobicity or hydrophilicity of the blocks so much that the co-gelling agent is not effective. Such substitution may affect the suitable values of x, y, and z. Successful deviations from the basic formulae (for example the basic formula in which A and C are hydrophobic, and can be an alkyl chain (saturated or unsaturated, linear or branched, and may contain one or more aromatic rings); B is hydrophilic, and can be ionic, for example may be polyacrylate, or non-ionic, with non-ionic being better for the betaine systems; Y is preferably above 10, and x and z are preferably less than 22) depends substantially on the surfactant and co-gelling agent concentrations, and the presence and concentration of other materials (especially salts and co-surfactants).

Suitable concentrations (in the final fluid system) are from about 0.005% to about 3%, for example from about 0.01% to about 0.5%, for example from about 0.01 to about 0.1%. These are very low concentrations for rheology enhancers or co-gelling agents.

The co-gelling agents of the present invention give the desired results with any VES system, for example those based on cationic, amphoteric, and zwitterionic viscoelastic surfactant systems. They have been found to be particularly effective with certain zwitterionic surfactants. In general, particularly suitable zwitterionic surfactants have the formula:

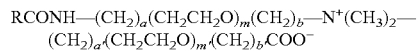

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% (of the as-received concentrate) of a condensation product of a naphthalene sulfonic acid, for example sodium polynaphthalene sulfonate, as a rheology modifier, as described in U.S. patent application Publication No. 2003-0134751. The surfactant in BET-E-40 is also shown below; one chemical name is erucylamidopropyl betaine. As-received concentrates of BET-E-40 were used in the experiments reported below. BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The co-gelling agents of the present invention may be used with viscoelastic surfactant fluid systems that contain such additives as co-surfactants, organic acids, organic acid salts, and/or inorganic salts.

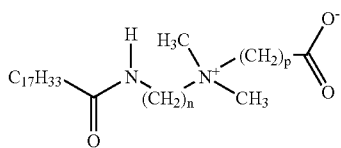

Sufactant in BET-O-30 (when n = 3 and p = 1)

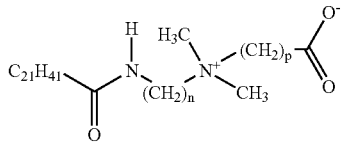

Sufactant in BET-E-40 (when n = 3 and p = 1)

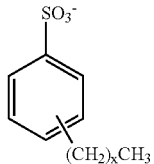

SDBS (when x = 11 and the counterion is Na$^+$)

Preferred embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. The surfactants are used at a concentration of about 0.5 to about 10%, preferably from about 1 to about 5%, and most preferably from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

$R_1N^+(R_2)(R_3)(R_4) \, X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4) \, X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates, for example polysulfonic acids, as described in copending U.S. patent application Publication No. 2003-0134751 which has a common Assignee as the present application and which is hereby incorporated by reference.

Another suitable cationic VES is erucyl bis(2-hydroxyethyl) methyl ammonium chloride, also known as (Z)-13 docosenyl-N-N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl)ammonium chloride; erucylamidopropyltrimethylamine chloride, octadecyl methyl bis(hydroxyethyl) ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl)ammonium 3,4,-dichlorobenzoate; cetyl tris(hydroxyethyl) ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl)ammonium bromide; hexadecyl ethyl bis(hydroxyethyl)ammonium chloride; hexadecyl isopropyl bis(hydroxyethyl)ammonium iodide; and cetylamino, N-octadecyl pyridinium chloride.

Amphoteric viscoelastic surfactants are also suitable. Exemplary amphoteric viscoelastic surfactant systems include those described in U.S. Pat. No. 6,703,352, for example amine oxides. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Viscoelastic surfactant fluids, for example those used in the oilfield, may also contain agents that dissolve minerals and compounds, for example in formations, scale, and filtercakes. Such agents may be, for example, acids and chelating agents, for example hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON™ synthetic resinous fluorine-containing polymer, and mixtures. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient). When VES fluids contain strong acids, they are typically not gelled and display low viscosity; when the pH increases as the acid reacts with the mineral, the system gels and the viscosity increases. Such fluids may be called viscoelastic diverting acids, or VDA's. The co-gelling agents of the present invention may be used in viscoelastic surfactant fluid systems containing acids and chelating agents.

Preparation and use (mixing, storing, pumping, etc.) of the improved VES fluid systems containing co-gelling agents of the invention are the same as for such fluids without the co-gelling agents. For example, the order of mixing is not affected by including these co-gelling agents. Optionally, the co-gelling agents may be incorporated in surfactant concentrates (provided that they do not affect component solubilities or concentrate freezing points) so that the concentrates can be diluted with an aqueous fluid to make VES systems. This maintains the operational simplicity of the VES systems. Such concentrates may contain other components such as freezing point depressants; examples are methanol, ethanol, isopropanol, ethylene glycol, and propylene glycol. As is normally the case in fluid formulation, laboratory tests should be run to ensure that the additives do not affect, and are not affected by, other components in the fluid (such as salts, for example). In particular, the co-gelling agents of the present invention may be used with other rheology modifiers. Adjusting the concentrations of surfactant, co-gelling agent, and other fluid components to account for the effects of other components is within the scope of the invention.

The fluid may be used, for example in oilfield treatments. As examples, the fluid may be used as a pad fluid and/or as a carrier fluid and/or as a diverter in hydraulic fracturing, as a carrier fluid for lost circulation control agents, as a carrier fluid for gravel packing, and as a diverter or a main fluid in acidizing and acid fracturing. The fluids may also be used in other industries, such as pharmaceuticals, cosmetics, printing, and agriculture.

The optimal concentration of a given rheology enhancing additive of the invention for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and co-gelling agent are those necessary to achieve the desired viscosity and shear recovery time as determined by experiment. Again, tolerance for, and optimal amounts of other additives may also be determined by simple experiment. In general, the amount of surfactant (as active ingredient) is from about 1 to about 10%. Commercially available surfactant concentrates may contain some materials that are themselves rheology enhancers, although they may be present for example for concentrate freezing point depression, so the amount of surfactant and co-gelling agent used is determined for the specific concentrate used. Mixtures of surfactants and/or mixtures of co-gelling agents (including mixtures of more than one co-gelling agent of the invention, and mixtures of one or more co-gelling agents of the invention with one or more other co-gelling agents) may be used. Mixtures of surfactants may include surfactants that are not viscoelastic surfactants when not part of a viscoelastic surfactant system. All mixtures are tested and optimized; for example, too much total co-gelling agent may decrease the beneficial effects.

EXAMPLE 1

Upon addition of a co-gelling agent to a BET-E-40 VES system, a new fluid system was made that demonstrated good viscosity profiles even at a concentration of 2-3% VES. (Results with 3% BET-E-40 VES are shown in FIG. 1; experiments have not been performed, but it is believed that lower concentrations can be used.) The as-received BET-E-40 used in the experiments contained about 1% of a sodium polynaphthalene sulfonate (see below). The co-gelling agent used was an ABA type material of formula 2 above with $x=z=12$, and $y=32$ as an example to demonstrate the effect. As shown in FIG. 1, this BET-E-40 system formed a good fluid at a concentration of 6%. Lowering the surfactant concentration to 3% without a co-gelling agent caused lowering of the fluid viscosity to too low a value at some temperatures. Not shown, is that lowering the surfactant concentration without a co-gelling agent also resulted in unacceptably long rehealing times after severe shear. When very small amounts of the co-gelling agent were added to make a new fluid formulation, the new fluids had good viscosity profiles at a VES concentration of 3%. Not shown is that the viscosity was suitable at a concentration of 2% as well. Their shear recovery time was as good as that of an otherwise identical fluid made with 6% VES and no co-gelling agent.

FIG. 1 gives the viscosity temperature profiles of a series of fluids using varied concentrations of this ABA co-gelling agent. The fluids with co-gelling agent also contained about 0.12% of DAXAD 19, a high molecular weight sodium polynaphthalene sulfonate available from Hampshire Chemical Corporation, Nashua, N.H., USA, and the fluids without co-gelling agent contained about 0.03% (for the 3% VES) and about 0.06% (for the 6% VES) of DAXAD 17, a low molecular weight sodium polynaphthalene sulfonate available from Hampshire Chemical Corporation, Nashua, N.H., USA. The performance of the 3% VES system without co-gelling agent would not be acceptable for typical oilfield treatment fluids once the temperature rose to above about 66° C., while with the addition of 0.025%, 0.05% and 0.075% of the ABA co-gelling agent, the performance of the 3% VES fluid was greatly improved. In addition, if the 3% VES system without co-gelling agent was sheared under severe conditions, it took a long time (about 1 minute) for the fluid to regain its viscoelasticity. Not shown is that sodium polynaphthalene sulfonate increased the shear recovery times, in some cases up to more than 10 minutes to recover. With the addition of 0.025% ABA chemical, the shear recovery times were reduced to only a few seconds.

EXAMPLE 2

Table 1 below shows the shear recovery times observed when various amounts of the ABA co-gelling agent of Example 1 was added to the VES surfactant system of Example 1. In these experiments, approximately 200 mL of already-mixed VES fluid was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by the recovery time estimated by visual observation. The fluid recovery time was the time at which fluid "lipping" occurred. The fluid "lips" when inclining the upper beaker or cup containing the fluid does not result in fluid flow into the container below, but rather the formation of a "lip", and pulling the container back to a vertical position pulls back the "lip". In fracturing fluid practice, "lipping" is used to estimate when the fluid reaches its near-equilibrium elasticity. The fluids also contained examples of clay control agents that would be used in oilfield treatment fluids; (TMAC is tetramethyl ammonium chloride).

TABLE 1

| VES | Daxad 19 | Daxad 17 | ABA | TMAC | KCl | Shear Recovery Time (sec) |
|---|---|---|---|---|---|---|
| 6% | | 0.06% | | 0.20% | or 2% | 12 |
| 3% | | 0.03% | | | | >120 |
| 3% | | | | | | >300 |
| 3% | 0.12% | | | 0.20% | | >300 |
| 3% | 0.12% | | | | 2% | >300 |
| 3% | 0.12% | | 0.025% | 0.20% | | 18 |
| 3% | 0.12% | | 0.050% | 0.20% | | 12 |
| 3% | 0.12% | | 0.075% | 0.20% | | 9 |
| 3% | 0.12% | | 0.025% | | 2% | 12 |
| 3% | 0.12% | | 0.050% | | 2% | 9 |
| 3% | 0.12% | | 0.075% | | 2% | 9 |

The table shows that with the addition of very small amounts of an ABA triblock oligomer, the shear recovery of a 3% VES fluid system can be as fast as or faster than the shear recovery of a 6% solution of the same VES. Without the ABA triblock oligomer, the shear recovery of the 3% solution is at least 25 times slower than the shear recovery of the 6% VES.

The ABA co-gelling agent used in these examples is sufficiently hydrophilic that a concentrate can readily be made by adding sufficient co-gelling agent, to the as-received BET-E-40 concentrate described above containing sodium polynaphthalene sulfonate, so that the concentrate can be diluted with an aqueous fluid to make VES systems like those of the example. This maintains the operational simplicity of the VES systems.

We claim:

1. An aqueous oilfield treatment composition comprising a viscoelastic surfactant and from 0.005% to 0.075% of a co-gelling agent wherein said viscoelastic surfactant comprises erucylamidopropyl betaine and said co-gelling agent comprises $H(CH_2)_xCO(OCH_2CH_2)_yOCO(CH_2)_zH$ wherein $x=z=12$ and $y=32$.

2. The composition of claim 1 further comprising an acid selected from the group consisting of hydrochloric acid, hydrofluoric acid, formic acid, acetic acid, lactic acid, glycolic acid, sulfamic acid, malic acid, citric acid, tartaric acid, maleic acid, methylsulfamic acid, chloroacetic acid, and mixtures thereof.

3. The composition of claim 1 further comprising a polynaphthalene sulfonate.

4. The composition of claim 1 wherein said fluid further contains a co-surfactant.

5. The aqueous oilfield treatment composition of claim 1, wherein said composition further comprises a second co-gelling agent selected from the group consisting of $H(CH_2)_x(OCH_2CH_2)_yO(CH_2)_zH$, $HO(CH_2CH_2O)_{x'}CO(CH_2)_yCO(OCH_2CH_2)_{z'}OH$ and $HO(CH_2CH_2O)_{x'}(CH_2)_y(OCH_2CH_2)_{z'}OH$, in which y is from about 10 to about 50, preferably from about 24 to about 36; y' is from about 4 to about 50, preferably from about 6 to about 24; x and z are from about 6 to about 22, preferably from about 8 to about 16; and x' and z' are from about 1 to about 50, preferably from about 3 to about 40, and further wherein the values of x and z, and of x' and z', may be the same.

6. An oilfield treatment method comprising:
   a. providing a fluid according to claim 1, and
   b. injecting said fluid down a well.

* * * * *